(12) United States Patent  
Lin

(10) Patent No.: US 9,033,355 B2  
(45) Date of Patent: May 19, 2015

(54) COMBANATION STRUCTURE OF A CART AND A BICYCLE

(71) Applicant: An Yi Lin, Taipei (TW)

(72) Inventor: An Yi Lin, Taipei (TW)

(*) Notice: Subject to any disclaimer, the term of this patent is extended or adjusted under 35 U.S.C. 154(b) by 0 days.

(21) Appl. No.: 13/968,408

(22) Filed: Aug. 15, 2013

(65) Prior Publication Data

US 2015/0048584 A1 Feb. 19, 2015

(51) Int. Cl.
*B62K 27/00* (2006.01)
*B62K 27/02* (2006.01)
*B62K 27/12* (2006.01)
*B62B 7/12* (2006.01)

(52) U.S. Cl.
CPC ............... *B62K 27/00* (2013.01); *B62K 27/02* (2013.01); *B62K 27/12* (2013.01); *B62B 7/126* (2013.01)

(58) Field of Classification Search
CPC .......... B62K 27/12; B62K 27/02; B62B 7/126
USPC ......................................... 280/204, 202, 304.1
See application file for complete search history.

(56) References Cited

U.S. PATENT DOCUMENTS

| | | | | |
|---|---|---|---|---|
| 4,767,130 A * | 8/1988 | Fu-Chao | ........................ | 280/202 |
| 4,770,431 A * | 9/1988 | Kulik | ............................ | 280/202 |
| 4,830,388 A * | 5/1989 | Wang | ............................ | 280/202 |
| 5,011,169 A * | 4/1991 | Henderson et al. | ........... | 280/202 |
| 5,039,120 A * | 8/1991 | Stowe | ........................... | 280/204 |
| 5,193,831 A * | 3/1993 | Capitoli | ........................ | 280/202 |
| 6,155,582 A * | 12/2000 | Bourbeau | .................... | 280/204 |
| 6,270,100 B1 * | 8/2001 | Wunderlich | .................. | 280/204 |
| 7,766,358 B1 * | 8/2010 | Phillips | ........................ | 280/204 |

* cited by examiner

*Primary Examiner* — Joseph Rocca  
*Assistant Examiner* — Marlon Arce

(57) ABSTRACT

A combination structure of a cart and a bicycle comprises a bicycle formed mainly by a backbone, a handle, a front wheel and a rear wheel; the handle, the front wheel and the rear wheel being combined to respective positions of the bicycle; a cart formed by a backbone, at least one front wheel, at least one rear wheels and at least one pushing rod; the cart being extended with at least one pushing rod; wherein a user can hold the pushing rods to rotate the at least one front wheel and the rear wheel so as to drive the cart to move forwards; and a hook extending from the cart for hooking the handle of the bicycle. The a cart may be combined to a bicycle directly or indirectly so that enabled old people or child, or expensive goods can be transferred easily.

6 Claims, 3 Drawing Sheets

COMBANATION STRUCTURE OF A CART AND A BICYCLE

FIELD OF THE INVENTION

The present invention relates to vehicles, and in particular to a combination structure of a cart and a bicycle.

BACKGROUND OF THE INVENTION

Currently, more and more old people or babies or enabled man or patients cannot move by themselves. They must be carried by wheelchairs. Sometimes, people uses carts (or wagons) to transfer pets or goods, while theses works need to apply manpower to wheelchairs, carts, or wagons. Since great manpower needs to drive the wheelchairs, carts, or wagons, the moving ranges of these vehicles are confined to be nearby of the driving people. A frequent event is to transfer the old people to a park for sunny. The servant will feel ill at ease due to a great power being applied, but the wheelchair only be moved within finite ranges.

Therefore, there is an eager demand for a novel design which can improve above mentioned defects.

SUMMARY OF THE INVENTION

Accordingly, the object of the present invention is to provides a motorcycle power charger device capable of indicating power level of a battery of the motorcycle, wherein the wheelchair (or a cart or a wagon) may be combined to a bicycle directly or indirectly so that enabled old people or child, or expensive goods can be transferred easily with less power and time. Furthermore, the people and goods can be safely transferred.

To achieve above object, the present invention provides a combination structure of a cart and a bicycle, comprising: a bicycle formed mainly by a backbone, a handle, a front wheel and a rear wheel; the backbone serving to assembly other components of the bicycle; the handle, the front wheel and the rear wheel being combined to respective positions of the bicycle; a cart formed by a backbone, at least one front wheel, at least one rear wheels and at least one pushing rod; the cart being extended with at least one pushing rod; wherein a user can hold the pushing rods to rotate the at least one front wheel and the rear wheel so as to drive the cart to move forwards; and a hook extending from the cart for hooking the handle of the bicycle.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 4, the structure of the present invention is illustrated. By the present invention, a user can drive a wheelchair by only riding a bicycle connected to the wheelchair. Furthermore, allover power for driving the wheelchair is reduced and the speed is increased. The structure of the present invention will be described hereinafter with the details thereof.

Figure 1:
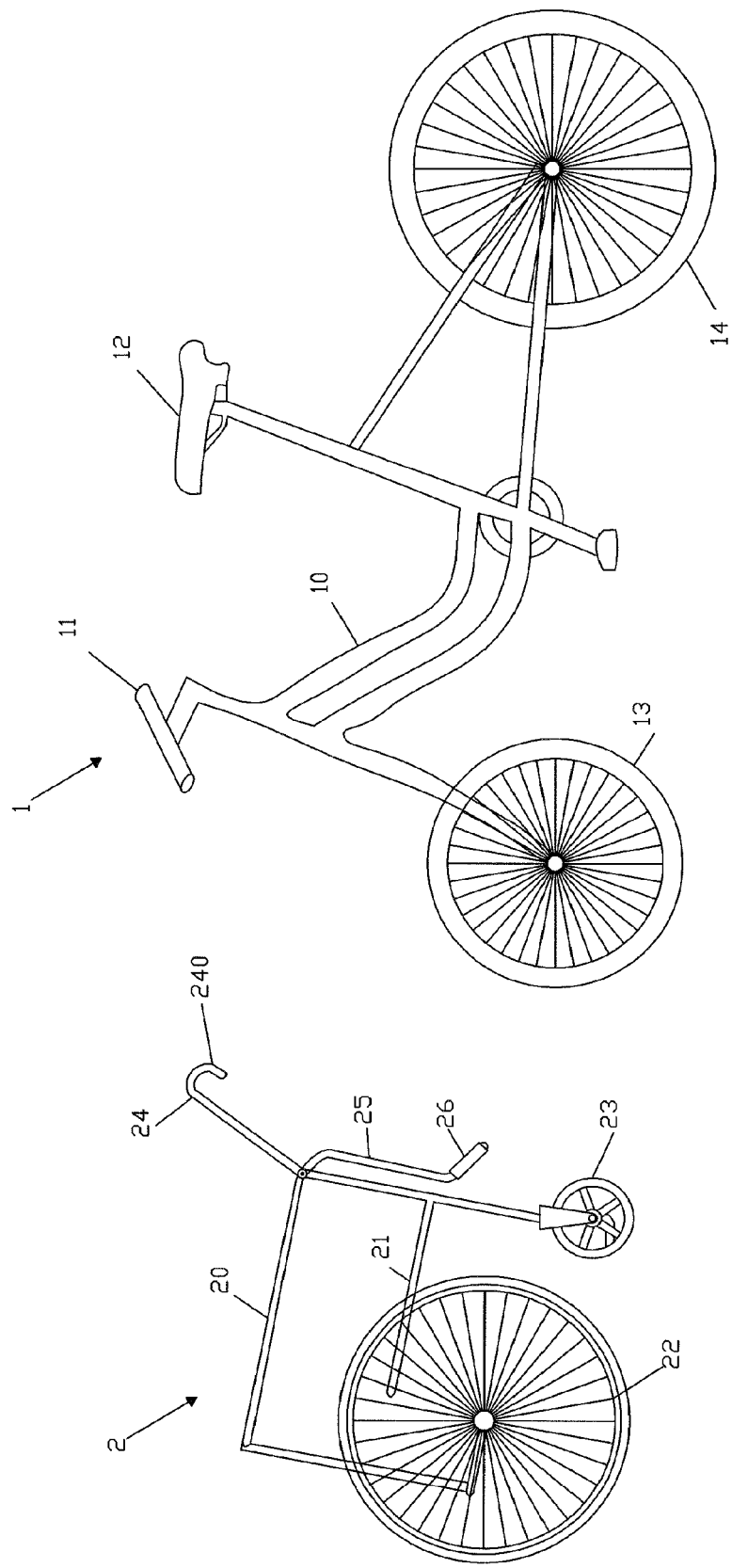
FIG. 1 is an exploded view of the present invention.

A bicycle 1 is formed mainly by a backbone 10, a handle 11, a cushion 12, a front wheel 13 and a rear wheel 14. The backbone 10 serves to assembly other components of the bicycle 1. The handle 11, cushion 12, front wheel 13 and rear wheel 14 are combined to the respective positions of the bicycle 1, as illustrated in FIG. 1. The diameter of the front wheel 13 is smaller than that of the rear wheel 14.

A wheelchair 2 is formed mainly by a backbone 20, a cushion 21 two front wheels 22 and at least one rear wheels 23 and two pushing rods 24. The diameter of each rear wheel 24 is smaller than that of the front wheel 23.

A rear end of the backbone 20 of the wheelchair 2 is extended with the two pushing rods 24, including one left pushing rod and one right pushing rod. The user can hold the pushing rods 24 to rotate the front wheels 22 and the rear wheel 23 so as to drive the wheelchair 2 to move forwards. A brake can be attached to the wheelchair 2. By operating the braking, the speed of the wheelchair 2 can be reduced.

Each of the left pushing rod and right pushing rod is formed with a hook 240. The hook 240 is formed with a curved hook for hooking the handle of the bicycle 1.

A linking shaft 25 is installed to an upper side of the rear wheel 23 of the wheelchair 2. A front end of the linking shaft 25 is actively installed to the rear end of the backbone 20 of the wheelchair 2. A rear end of the linking shaft 25 has a locking unit 26. As assembling the wheelchair 2 to the bicycle 1, the locking unit 26 at the rear end of the linking shaft 25 will be locked to a front shaft of the bicycle 1 so that the wheelchair 2 can be fixed to the front shaft of the bicycle 1.

Figure 2:
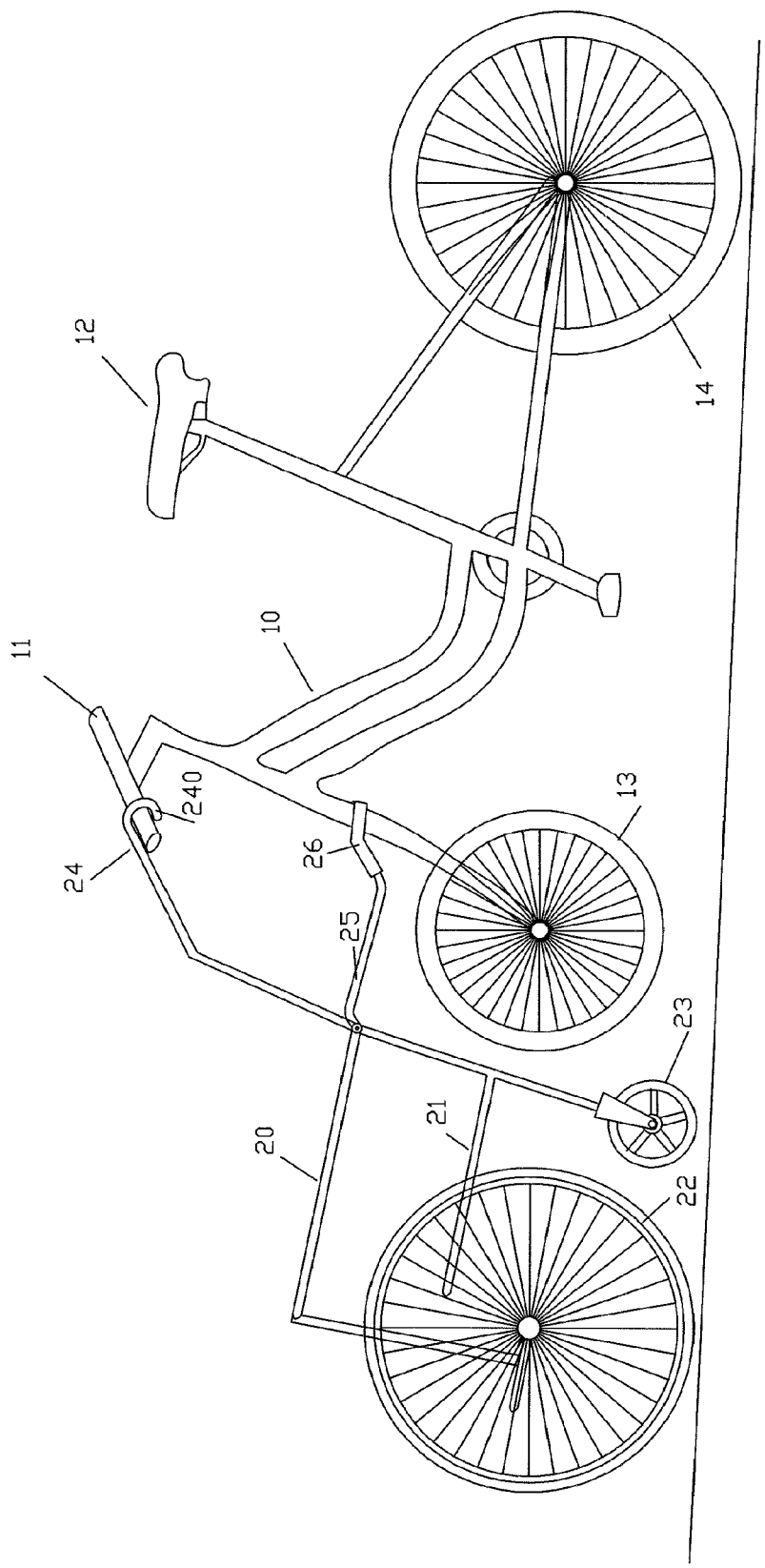
FIG. 2 is an assembly view of the present invention.
Figure 3:
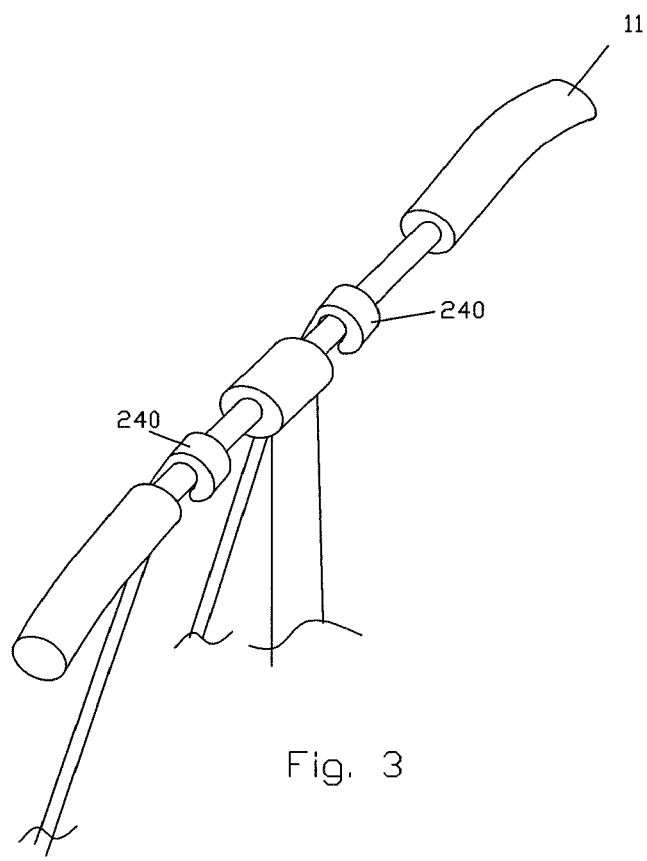
FIG. 3 is a partial schematic view showing the handle of the present invention.
Figure 4:
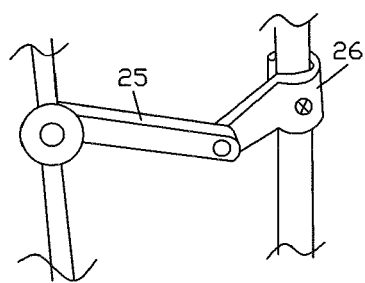
FIG. 4 is a partial schematic view showing the linking shaft of the present invention.

In the present invention, the length of the linking shaft 25 is designed to cause that, as illustrated in FIG. 2, when the linking shaft 25 of the wheelchair 2 is fixed to the front wheel 13 of the bicycle 1, the front wheel 13 of the bicycle 1 and the rear wheel 23 of the wheelchair 2 are not grounded so as to reduce the friction force on the ground.

When the wheelchair 2 is combed to the bicycle 1, the rear wheel 23 of the wheelchair 2 and the front wheel 13 of the bicycle 1 are not grounded. In moving, only the front wheels 22 of the wheelchair 2 and the rear wheel 14 of the bicycle 1 are grounded, the driver only needs to brake the rear wheel 14 of the bicycle 1 or to brake the wheelchair 2 for speed reduction.

Moreover, since the front wheel 13 of the bicycle 1 has not grounded, when the driver drives the bicycle 1 with the wheelchair 2, the drive only needs to operate the brake of the wheelchair 2 for speed reduction.

In above description, a wheelchair 2 is used as an example to describe the details of the present invention, however, in the present invention, the wheelchair 2 of the present invention may be replaced by a small cart or a wagon for carrying animals or goods.

In the present invention, the hooks 240 in the left and right pushing rods 24 and the locking unit of the linking shaft 25 may have other forms which are shown in the drawings of the present invention. Other structure may connected to the wheelchair 2 to the bicycle 1 is also permissible in the scope of the present invention. The hooks 240 of the pushing rods 24 of the wheelchair 2 may be buckles, locks, tying rings, tying ropes, etc., all these are within the scope of the present invention.

In application of the present invention, the user only needs to hook the hooks 240 of the pushing rods 24 to the handle of the bicycle 1 and then the rear end of the linking shaft 25 is locked to the front shaft of the bicycle 1 so that the wheelchair 2 can be steadily locked to the bicycle 1. Since the length of the linking shaft 25 is designed to cause that in combination structure, the front wheel 13 of the bicycle 1 and the rear wheel 23 of the wheelchair 2 are not grounded, only the rear wheel 14 of the bicycle 1 and the front wheels 22 of the wheelchair 2 are grounded. The user can only drive the bicycle 1 so as to achieve the object of driving the wheelchair 2 to move forwards or backwards. Therefore, the moving ranges of the wheelchair 2 are expanded greatly and the speed is increased greatly.

Another advantages of the present invention are that the wheelchair 2 (or a cart or a wagon) may be combined to a bicycle 1 directly or indirectly so that enabled old people or child, or expensive goods can be transferred easily with less power and time. Furthermore, the people and goods can be safely transferred.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A combination structure of a cart and a bicycle, comprising:
a bicycle formed by a first backbone, a handle, a front wheel and a rear wheel; the first backbone serving to secured other components of the bicycle; the handle, the front wheel and the rear wheel being combined to respective positions of the bicycle;
a cart formed by a second backbone, at least one front wheel, at least one rear wheels and at least one pushing rod; the cart being extended with at least one pushing rod; wherein a user can hold the pushing rods to rotate the at least one front wheel and the rear wheel so as to drive the cart to move forwards; and
a hooking member extending from the cart for hooking the handle of the bicycle;
a linking shaft installed to an upper side of the rear wheel of the wheelchair; a front end of the linking shaft being movably installed to the rear end of the second backbone of the wheelchair; a rear end of the linking shaft having a locking unit; in an assembling state, the locking unit at the rear end of the linking shaft is locked to a front shaft of the bicycle so that the wheelchair can be fixed to the front shaft of the bicycle;
wherein a diameter of the front wheel of the bicycle is smaller than that of the rear wheel of the bicycle; and a diameter of each rear wheel of the cart is smaller than that of the front wheel; a length of the linking shaft is designed such that when the linking shaft of the wheelchair is fixed to the front wheel of the bicycle, the front wheel of the bicycle and the rear wheel of the wheelchair are not grounded so as to reduce the friction force on the ground.

2. The combination structure of a cart and a bicycle as claimed in claim 1, wherein a rear end of the second backbone of the wheelchair is extended with the two pushing rods, including one left pushing rod and one right pushing rod.

3. The combination structure of a cart and a bicycle as claimed in claim 1, wherein the hooking member is one of buckles, locks, tying rings, tying ropes.

4. The combination structure of a cart and a bicycle as claimed in claim 1, wherein the end of the linking shaft has one of buckles, locks, tying rings, and tying ropes.

5. The combination structure of a cart and a bicycle as claimed in claim 1, wherein the cart is a wheelchair.

6. The combination structure of a cart and a bicycle as claimed in claim 1, wherein the cart is a wagon.

* * * * *